United States Patent
Karlsson

(10) Patent No.: US 8,991,547 B2
(45) Date of Patent: Mar. 31, 2015

(54) DRIVELINE WITH PENDULUM SUSPENDED DRIVE SHAFT

(75) Inventor: Pontus Karlsson, Örnsköldsvik (SE)

(73) Assignee: Bae Systems Hägglunds Aktiebolag, Örnsköldsvik (SE)

( * ) Notice: Subject to any disclaimer, the term of this patent is extended or adjusted under 35 U.S.C. 154(b) by 45 days.

(21) Appl. No.: 13/522,309

(22) PCT Filed: Dec. 27, 2010

(86) PCT No.: PCT/SE2010/051487
§ 371 (c)(1),
(2), (4) Date: Oct. 12, 2012

(87) PCT Pub. No.: WO2011/087426
PCT Pub. Date: Jul. 21, 2011

(65) Prior Publication Data
US 2013/0047781 A1 Feb. 28, 2013

(30) Foreign Application Priority Data
Jan. 14, 2010 (SE) .................... 1050035

(51) Int. Cl.
*B60K 1/00* (2006.01)
*B60K 17/24* (2006.01)
*H02K 7/00* (2006.01)

(52) U.S. Cl.
CPC *H02K 7/003* (2013.01); *B60K 1/00* (2013.01); *B60K 2001/001* (2013.01)
USPC ......... 180/358; 180/379; 180/65.1; 180/243; 180/292

(58) Field of Classification Search
USPC ........ 180/377–379, 358, 65.1, 242, 243, 291, 180/292
See application file for complete search history.

(56) References Cited

U.S. PATENT DOCUMENTS

| | | |
|---|---|---|
| 5,971,413 A | 10/1999 | El-Kassouf |
| 2005/0272547 A1 | 12/2005 | House |
| 2008/0246241 A1 | 10/2008 | Mollhagen |

FOREIGN PATENT DOCUMENTS

| | | |
|---|---|---|
| FR | 2680732 A1 | 3/1993 |
| JP | 54-96925 | 12/1952 |
| JP | 2005-231526 | 9/2005 |
| JP | 2009-171767 | 7/2009 |

OTHER PUBLICATIONS

International Search Report and Written Opinion received for PCT Patent Application No. PCT/SE2010/051487, mailed on Apr. 5, 2011, 11 pages.
Notice of Reasons for Rejection mailed Apr. 30, 2014, directed to JP Application No. 2012-548916; 7 pages.

*Primary Examiner* — Ruth Ilan
(74) *Attorney, Agent, or Firm* — Morrison & Foerster LLP

(57) ABSTRACT

The invention relates to a driveline for a motor vehicle comprising drive shaft (20) suspended by means of a pendulum suspension (30), the pendulum suspension (30) comprising a fastening configuration (32, 34) fixedly connected to the vehicle and a drive shaft fastening (106) connected to the drive shaft (20) and pivotably journalled in bearings relative to the fastening configuration (32, 34), wherein the transmission configuration (50) comprises a driven input shaft (52), wherein an electric motor (60) is arranged for driving of the drive shaft (20), wherein the rotor of the electric motor (60) is connected to the input shaft (52) and a non-rotating portion of the electric motor (60) comprising the stator (66) of the electric motor (60) is fixedly connected to said drive shaft fastening (106). The invention also relates to a motor vehicle.

9 Claims, 3 Drawing Sheets

DRIVELINE WITH PENDULUM SUSPENDED DRIVE SHAFT

CROSS REFERENCE TO RELATED APPLICATIONS

This is a U.S. National Phase patent application of PCT/SE2010/051487, filed Dec. 27, 2010, which claims priority to the Swedish Patent Application No. 1050035-3, filed Jan. 14, 2010, each of which is hereby incorporated by reference in the present disclosure in its entirety.

TECHNICAL FIELD

The invention relates to a driveline with a pendulum suspended drive shaft according to the preamble of claim 1. The invention also relates to a motor vehicle.

BACKGROUND ART

In a conventional driveline of e.g. a four-wheel driven motor vehicle such as a mining vehicle, the cardan shaft is arranged to transmit the power to the drive shafts. In order to improve accessibility of the vehicle one of the drive shafts is pendulum suspended while the other is rigidly fixed to the frame. The pendulum suspension allows for the drive shaft to be turned about an axle perpendicular to the same, e.g. +/−10 degrees from its ground position. The motor vehicle may be articulated or controlled in a conventional way.

A pendulum suspended drive shaft is normally journalled in slide bearings, wherein wear occurs during pendulum. The wear results in the shaft moving over time such that the belly clearance of the vehicle becomes lower. In order to compensate for this, today a clutch between drive shaft and a fixed point on the cardan shaft is provided, usually where the transmission connects, compensating said movement. Such a coupling results in a complicated construction and occupies space.

OBJECT OF THE INVENTION

An object of the present invention is to provide a driveline with a pendulum suspended drive shaft which is energy efficient and at the same time space efficient and results in little wear on drive components.

SUMMARY OF THE INVENTION

These and other objects, apparent from the following description, are achieved by a means of a driveline and a motor vehicle, which are of the type stated by way of introduction and which in addition exhibit the features described herein. Preferred embodiments of the inventive driveline are also described.

According to the invention the objects are achieved with a driveline for a motor vehicle comprising a drive shaft suspended by means of a pendulum suspension, the pendulum suspension comprising a fastening configuration fixedly connected to the vehicle and a drive shaft fastening connected to the drive shaft and pivotably journalled in bearings relative to said fastening configuration; a differential for driving the drive shaft, wherein the differential comprises a driven input shaft, wherein an electric motor is arranged for driving the drive shaft, wherein the rotor of the electric motor is connected to the input shaft and a non rotating portion of the electric motor comprising the stator of the electric motor is fixedly connected to said drive shaft fastening.

By using an electric motor an energy efficient drive line is obtained. By arranging the electric motor in this way no coupling between electric motor and differential for compensating for geometrical changes occurring over time due to wear is required. Due to the fastening of the non rotating portion of the electric motor with the drive shaft fastening space requirements are decreased in that the connection may be made compact. Further no additional suspension of the electric motor is required since the entire force is carried by the drive shaft fastening.

According to an embodiment of the driveline said pivotable bearing comprises slide bearings. The advantage of using slide bearings is that it is space saving for the pendulum suspended drive shaft.

According to an embodiment of the driveline said non rotating portion of the electric motor is connected to the drive shaft fastening inside of said slide bearings internal bearing part. Hereby the risk for breaking, bending or the corresponding of the rotor/rotor shaft connected to the input shaft during rotation of the drive shaft fastening relative to the fastening configuration is eliminated.

According to an embodiment of the driveline said drive shaft fastening comprises an outer cone wherein said slide bearing is arranged between said outer cone and said fastening configuration. Hereby a more robust and reliable connection where the outer cone constitute a protective part is facilitated.

According to an embodiment of the driveline said fastening configuration comprises a front and a rear rocker arm suspension. This results in a stable suspension of the drive shaft.

According to an embodiment of the driveline said drive shaft fastening comprises an inner cone arranged internally to said outer cone. Hereby the inner cone constitutes a protected part, and protects the transmission configuration.

According to an embodiment of the driveline said non rotating portion of the electric motor is connected to said outer cone. Since the outer cone advantageously may constitute a supporting part this results in a robust connection.

According to an embodiment of the driveline said non rotating portion of the electric motor is connected to said inner cone. This results in a protected connection of the electric motor.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which:

FIG. 4b schematically illustrates a side view of the part of the driveline in FIG. 4a; and FIG. 4c schematically illustrates a front view of the part of the drive line in FIG. 4a.

DETAILED DESCRIPTION

Figure 1:
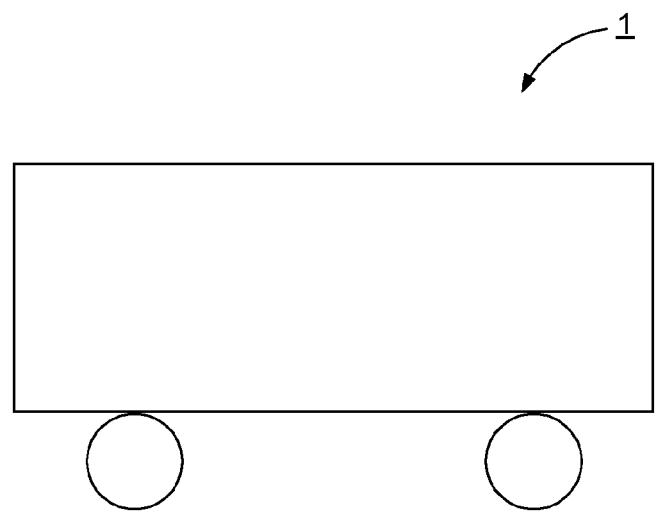
FIG. 1 schematically illustrates a side view of a motor vehicle according to an embodiment of the present invention.

FIG. 1 schematically illustrates a motor vehicle 1 according to an embodiment of the present invention. The motor vehicle 1 is according to an embodiment constituted by a construction vehicle. The motor vehicle 1 is according to an embodiment constituted by an articulated vehicle 1. The motor vehicle 1 is constituted by en electric hybrid vehicle, a diesel electric vehicle or an electric vehicle.

Figure 2:
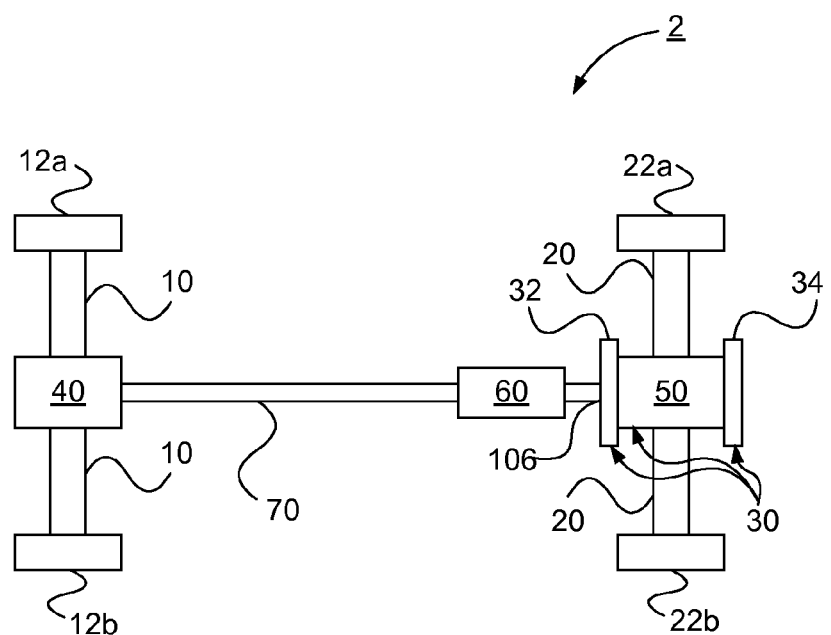
FIG. 2 schematically illustrates a plane view of a driveline according to an embodiment of the present invention.
Figure 3:
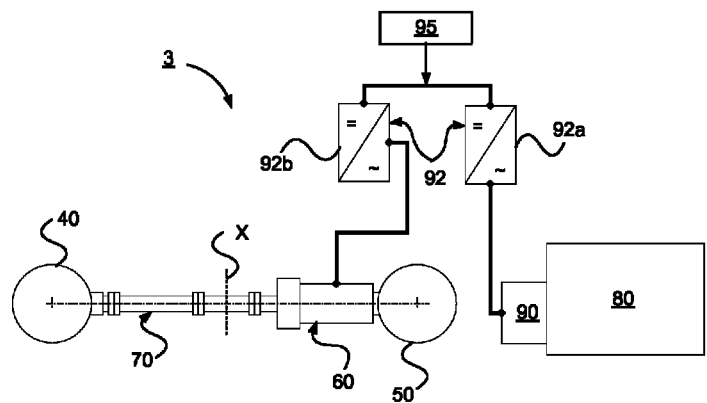
FIG. 3 schematically illustrates a side view of a driveline according to an embodiment of the present invention.

FIG. 2 schematically illustrates a plane view of a driveline 2 according to an embodiment of the present invention and FIG. 3 schematically illustrates a side view of a driveline 3 according to a variant of the driveline in FIG. 2.

The driveline 2; 3 according to these embodiments comprises a front drive shaft 10 arranged to drive front wheels 12*a*, 12*b* and rear drive shaft suspended by means of a pendulum suspension 30 and arranged to drive rear wheels 22,*a*, 22*b*.

Figure 4A:
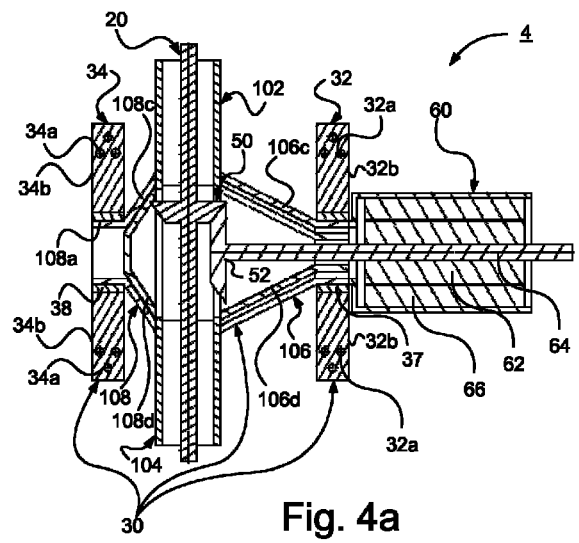
FIG. 4a schematically illustrates a plane view of a part of the driveline in FIG. 2 comprising drive shaft configuration and electric motor according to an embodiment of the present invention.
Figure 4B:
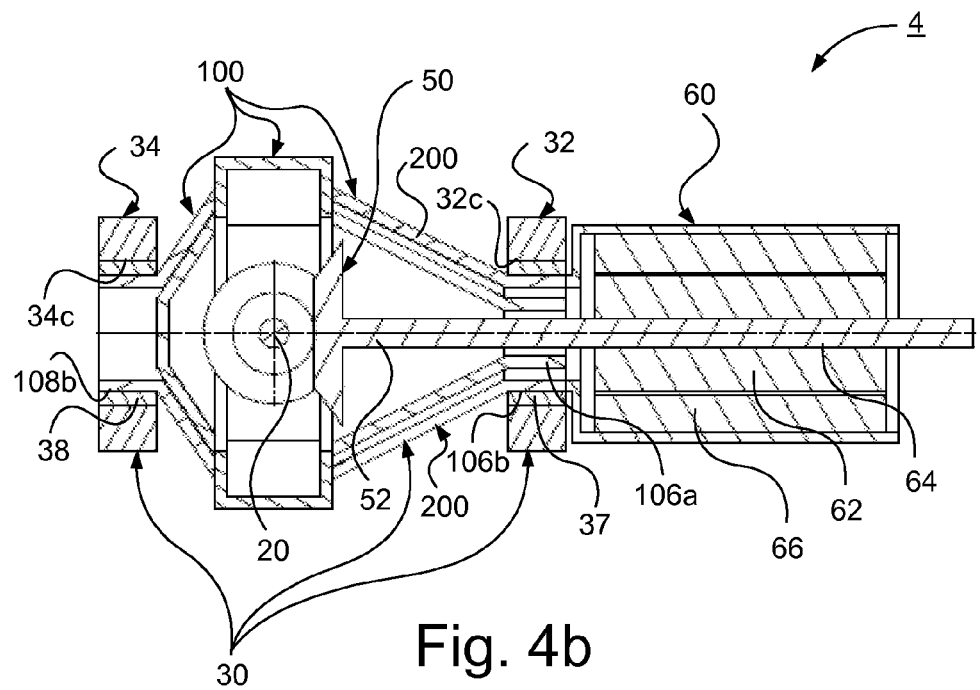
Figure 4C:
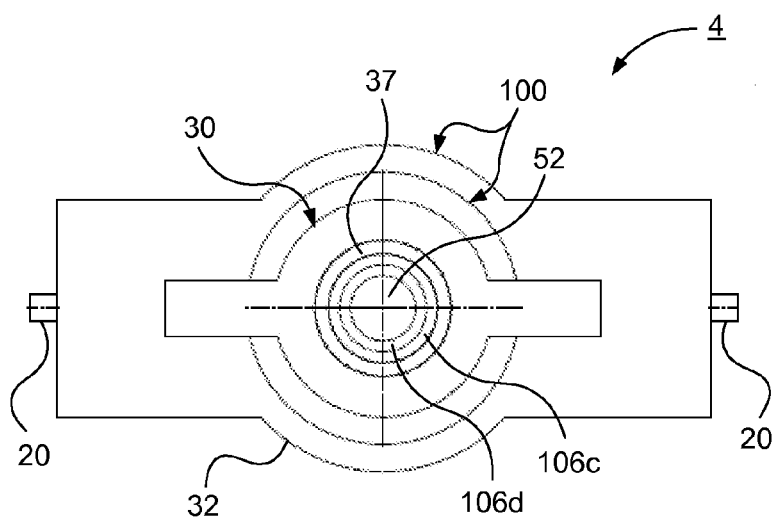

The pendulum suspension comprises a fastening configuration 32, 34 fixedly connected to the vehicle and a drive shaft fastening 106 connected to the drive shaft 20 and pivotably journalled in bearings relative to said fastening configuration 32, 34, which are shown in more detail in FIG. 4*a-c*, the fastening configuration 32, 34 comprising a front rocker arm suspension 32 and a rear rocker arm suspension 34.

The driveline 2; 3 comprises a front transmission configuration 40 for driving the front drive shaft 10, where the front transmission configuration 40 may be constituted by a differential or a bevel gear. The front transmission configuration 40 comprises a driven front input shaft or a front pinion, not shown in FIGS. 2 and 3. The driveline further comprises a rear transmission configuration 50 for driving of the rear drive shaft 20, where the rear transmission configuration 50 may be constituted by a differential or a bevel gear. The rear transmission configuration 50 comprises a driven rear input shaft or rear pinion, not shown in FIGS. 2 and 3.

The driveline comprises an electric motor 60 for driving the front and rear drive shaft 10, 20, wherein the rotor of the electric motor is connected to the rear input shaft and a non rotating portion of the electric motor 60 comprising the stator of the electric motor is fixedly connected to said fastening configuration, which is apparent from FIG. 4.

The driveline further comprises a cardan shaft 70 which is arranged between the electric motor and the front transmission configuration and connected in one end to the rotor of the electric motor 60 and in the other end to the front input shaft.

The driveline, according to the embodiment in FIG. 3, comprises a combustion engine 80 and a generator 90 connected to the combustion engine 80. The generator is connected to the electric motor and arranged to drive the electric motor. The generator is according to this embodiment connected to the electric motor via a voltage converter 92. Said voltage converter 92 comprises a rectifier 92*a* arranged to rectify the alternating voltage from the generator 90, and an inverter 92*b* arranged to invert the direct-current voltage from the generator 90, such that the voltage and frequency for the electric motor 60 may be controlled, the frequency controlling the rotational speed and the voltage the torque. Hereby engagement of an energy storage unit such as a battery unit or the corresponding is also facilitated, the energy storage unit 95 being illustrated with a dashed and dotted line as an optional alternative.

The dotted line X illustrates that the driveline of the vehicle could be a driveline for an articulated vehicle.

A driveline according to FIG. 3 as mentioned constitutes only an example. Any suitable driveline may be used, such as a driveline for an electric hybrid vehicle, for a diesel electric vehicle or for an electric vehicle. In an electric vehicle e.g. no combustion engine is required.

FIG. 4*a-c* schematically illustrate different view of a part 4 of the driveline in FIG. 2 comprising drive shaft configuration and electric motor 60 according to an embodiment of the present invention.

The pendulum suspended drive shaft configuration comprises a drive shaft 20 and a pendulum suspension, the drive shaft 20 being pendulum suspended by means of said pendulum suspension 30.

The pendulum suspension 30 comprises a fastening configuration 32, 34 fixedly connected to the vehicle and drive shaft fastening 106 connected to the drive shaft 20 and pivotably journalled in bearings relative to said fastening configuration 32, 34. Said pivotable bearing comprises slide bearings 37, 38.

The fastening configuration 32, 34 comprises a front and a rear rocker arm suspension 32, 34. The front rocker arm suspension 32 is arranged in front of the drive shaft 20 and the rear rocker arm suspension is arranged behind the drive shaft 20, i.e. the drive shaft 20 is arranged between the front rocker arm suspension 32 and the rear rocker arm suspension 34. Hereby a stable suspension of the drive shaft 20 is obtained. According to this embodiment, where the drive shaft 20 is constituted by a rear drive shaft 20, the front rocker arm suspension 32 is arranged between the drive shaft 20 and the electric motor 60. The respective rocker arm suspension 32, 34 is fixedly connected to the vehicle by means of fasteners 32*a*, 34*a*.

The respective rocker arm suspension 32, 34 has an essentially ring shaped profile from which an essentially horizontal arm 32*b*, 34*b* projects from each side. Said fasteners 32*a*, 34*a* are arranged to be attached to the vehicle at the respective arm 32*b*, 34*b*. The respective rocker arm suspension 32, 34 has an inner ring shaped surface 32*c*, 34*c*.

The drive shaft configuration in addition comprises a transmission configuration 50 for driving the drive shaft 20, wherein the transmission configuration 50 comprises a driven input shaft 52 or a pinion 52. The transmission configuration 50 is according to this embodiment constituted by a bevel gear. According to an alternative embodiment the transmission configuration 50 is constituted by a differential.

The driving input shaft 52 extends essentially in the longitudinal direction of the vehicle and is consequently perpendicular relative to the drive shaft 20, wherein the driving power is arranged to be transmitted via the transmission configuration 50, here the bevel gear. The input shaft 52 is connected to the rotor 62 of the electric motor 60, the rotor shaft 64 of the rotor 62 being is connected directly or via a gear configuration such as a planetary gear (not shown) to said input shaft 52. According to a variant the extension of the rotor shaft 64 and said input shaft 52, i.e. said pinion, constitute an integrated part.

The transmission configuration 50 and portion of the drive shaft 20 are housed in a central portion of a housing configuration 100. The housing configuration 100 comprises substantially tubular extensions 102, 104 transversally extending from each side of the central portion of the housing configuration, in which tubular extensions the drive shaft 20 is arranged to run.

The housing configuration 100 further comprises a first cone shaped extension 106 longitudinally extending from its front portion and which tapers in the forward direction, and a second cone shaped extension 108 longitudinally extending from its rear portion and which tapers in the backward direction.

The first cone shaped extension 106 of the housing configuration is journally connected to the front rocker arm suspension 32 at an end portion 106*a* via a first slide bearing 37, wherein the first cone shaped extension 106 is rotatable relative to the front rocker arm suspension 32. The first slide bearing 37 is thus arranged between the inner ring shaped surface 32c of the front rocker arm suspension 32 and an outer surface 106b of the end portion 106a of the first cone shaped extension 106.

The second cone shaped extension 108 of the housing configuration is journally connected to the rear rocker arm suspension 34 at an end portion 108a via a second slide bearing 38, wherein the second cone shaped extension 108 is rotatable relative to the rear rocker arm suspension 34. The second slide bearing 38 is thus arranged between the inner ring shaped surface 34c of the rear rocker arm suspension 34 and an outer surface 108b of the end portion 108a of the second cone shaped extension 108.

The first cone shaped extension 106 of the housing configuration 100 is connected to the stator 66 of the electric motor 60 at the end portion 106a, the drive shaft fastening comprising said cone shaped extension 106. The electric motor 60 is connected to the cone shaped extension 106 inside the first slide bearing 37.

The first cone shaped extension 106 of the housing configuration 100 comprises an outer cone 106c and an inner cone 106d arranged internally to said outer cone 106c. The inner cone 106d constitutes protection of the input shaft 52. The outer surface 106b of the outer cone 106c is consequently slidingly arranged against the first slide bearing 37. The outer cone 106c is according to this embodiment load supporting. The outer cone 106c is according to this embodiment connected to the stator 66 of the electric motor 60, wherein the electric motor 60 is connected to the outer cone 106c and internally to the first slide bearing 37. The outer cone 106c and the stator of the electric motor may be connected by means of any suitable connection such as e.g. a screw joint reinforcement.

According to an alternative embodiment the electric motor 60 is connected to the inner cone 106d, the electric motor 60 also being connected to the inner cone 106d inside the first slide bearing 37. Said connection comprises fasteners, the fastener according to an embodiment being constituted by a screw joint reinforcement.

According to yet another alternative embodiment the electric motor 60 is connected between the outer and the inner cone by means of fastener the fastener according to a variant being constituted by a screw joint reinforcement.

Due to the fact that the electric motor 60 is connected to the first cone shaped extension 106, i.e. the outer cone and/or the inner cone, the risk for breaking between rotor shaft 64 and input shaft 52 due to wear of the upper portion of the slide bearing 37 occurring due to the weight of the vehicle is eliminated.

The second cone shaped extension 108 of the housing configuration 100 comprises an outer cone 108c and an inner cone 108d arranged internally to said outer cone. The outer surface 108b of the outer cone 108c is consequently slidably arranged against the second slide bearing 38. The outer cone 108c is according to this embodiment load supporting. The inner cone 108d constitutes protection for the transmission configuration.

The drive shaft fastening consequently comprises an outer cone and en inner cone arranged internally to the outer cone. Said slide bearing is arranged between said outer cone and said fastening configuration.

The rotor 60 of the electric motor is connected to the input shaft for driving of said input shaft. A non-rotating portion of the electric motor 60 comprising the stator 60 of the electric motor is fixedly connected to said inner cone of the drive shaft fastening.

According to an alternative embodiment the front drive shaft of the vehicle is pendulum suspended.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. Driveline for a motor vehicle comprising drive shaft suspended by means of a pendulum suspension, the pendulum suspension comprising a fastening configuration fixedly connected to the vehicle and a drive shaft fastening connected to the drive shaft and pivotably journalled relative to the fastening configuration, wherein the transmission configuration comprises a driven input shaft, characterized by an electric motor arranged for driving of the drive shaft, wherein the rotor of the electric motor is connected to the input shaft and a non-rotating portion of the electric motor comprising the stator of the electric motor is fixedly connected to said drive shaft fastening, and wherein the electric motor is placed outside the drive shaft fastening.

2. Driveline according to claim 1, wherein said drive shaft fastening is pivotably journalled relative to said fastening configuration in a pivotable bearing, and wherein said pivotable bearing comprises a slide bearing.

3. Driveline according to claim 2, wherein said non-rotating portion of the electric motor is connected to the drive shaft fastening inside an inner bearing part of said slide bearing.

4. Driveline according to claim 2, wherein said drive shaft fastening comprises an outer cone wherein said slide bearing is arranged between said outer cone and said fastening configuration.

5. Driveline according to claim 4, wherein said fastening configuration comprises a front and a rear rocker arm suspension.

6. Driveline according to claim 4, wherein said drive shaft fastening comprises an inner cone arranged internally to said outer cone.

7. Driveline according to claim 4, wherein said non-rotating portion of the electric motor is connected to said inner cone.

8. Driveline according to claim 6, wherein said non-rotating portion of the electric motor is connected to said outer cone.

9. Motor vehicle comprising a driveline according to claim 1.

* * * * *